Oct. 1, 1963  R. G. FERRIS  3,105,693
MATERIAL UNLOADING AND SPREADING APPARATUS
Filed May 21, 1962  3 Sheets-Sheet 2
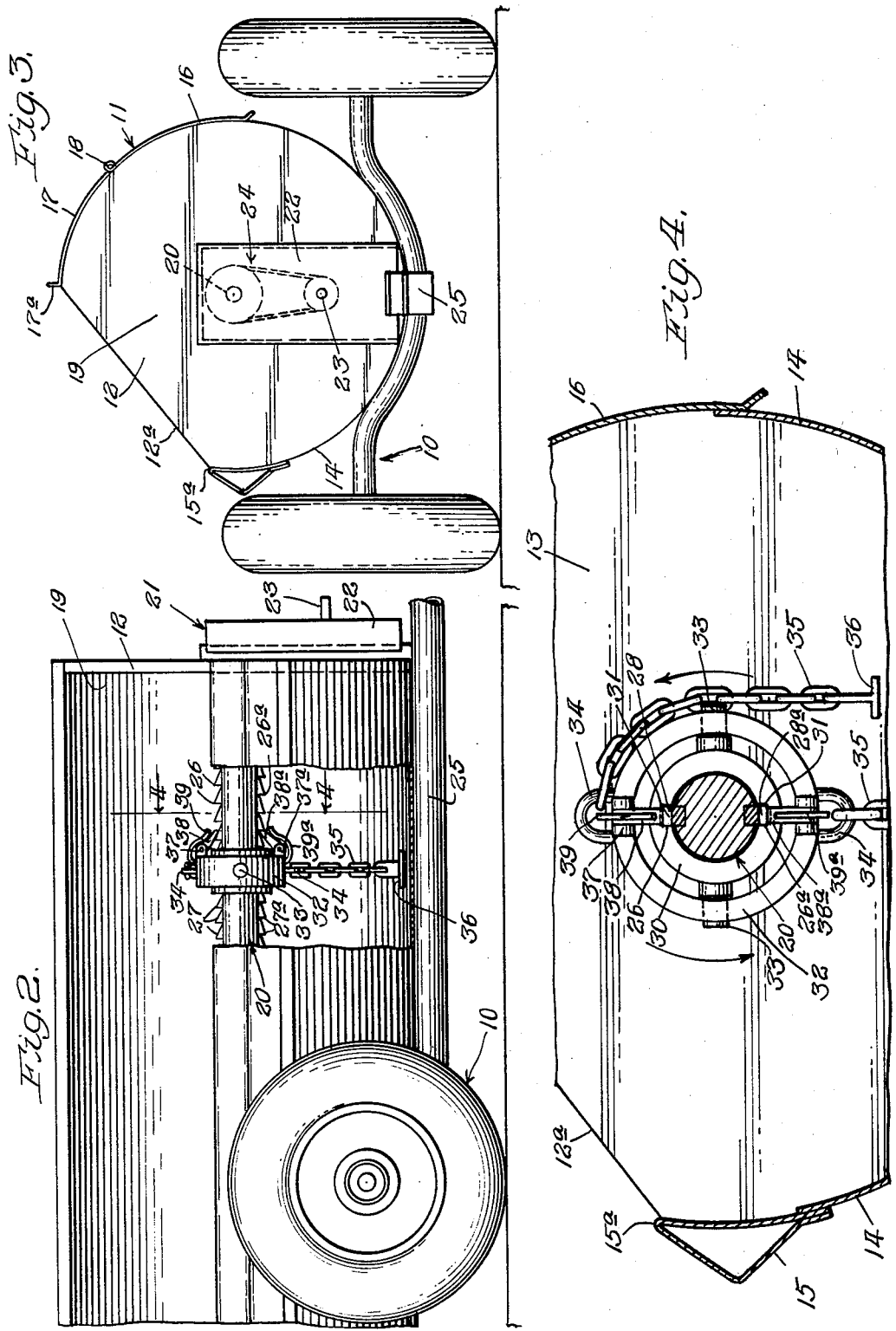

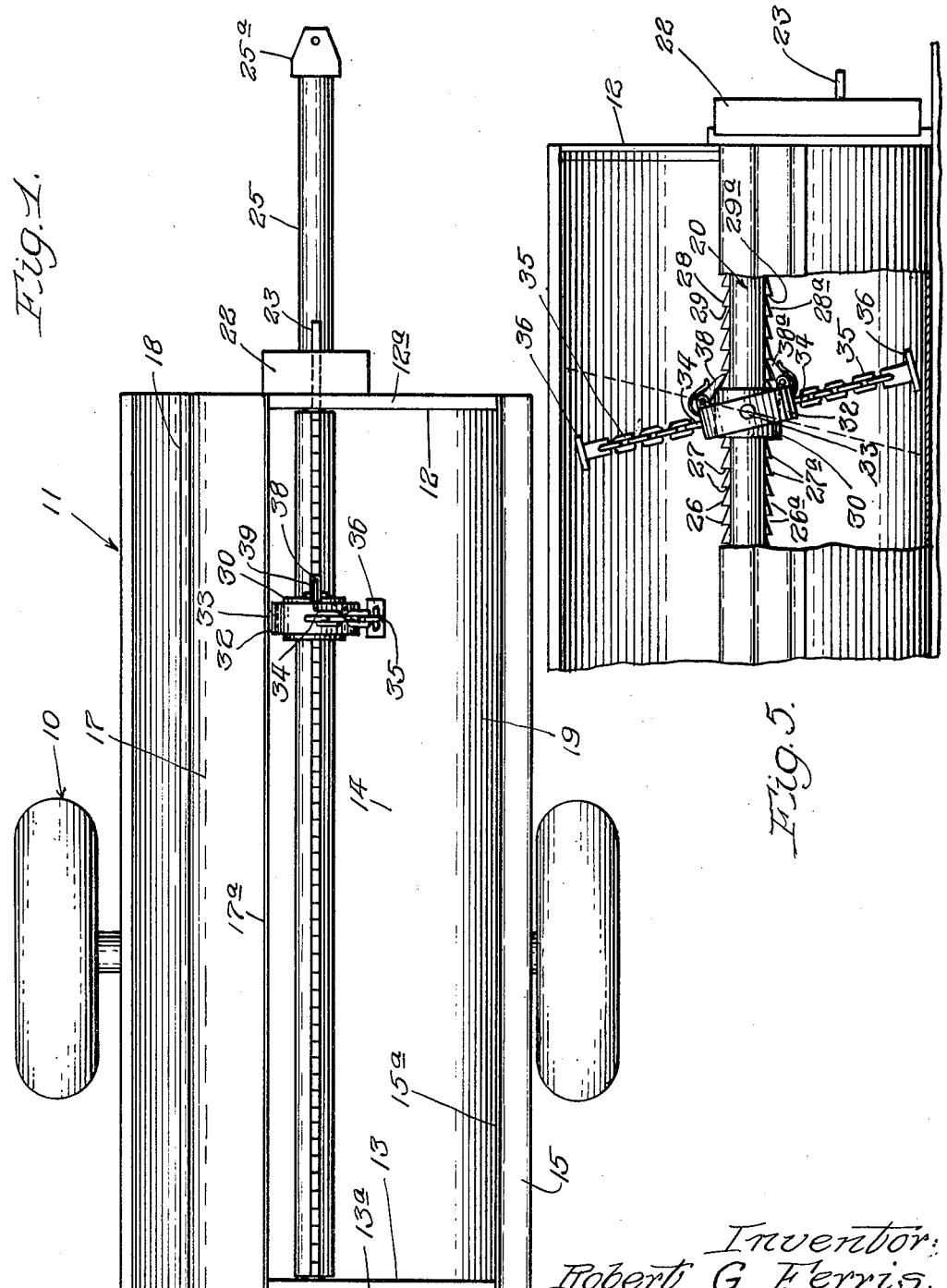

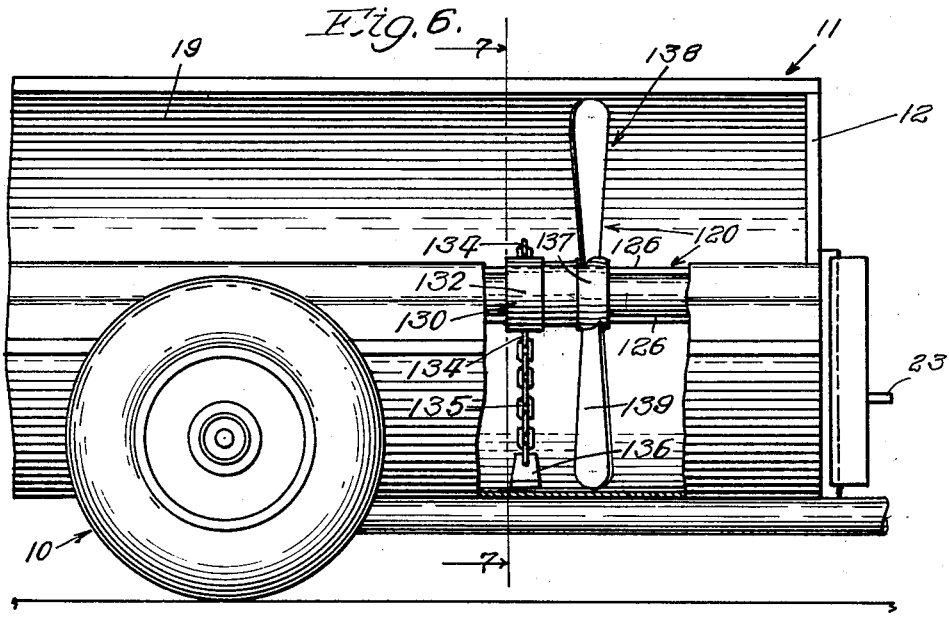
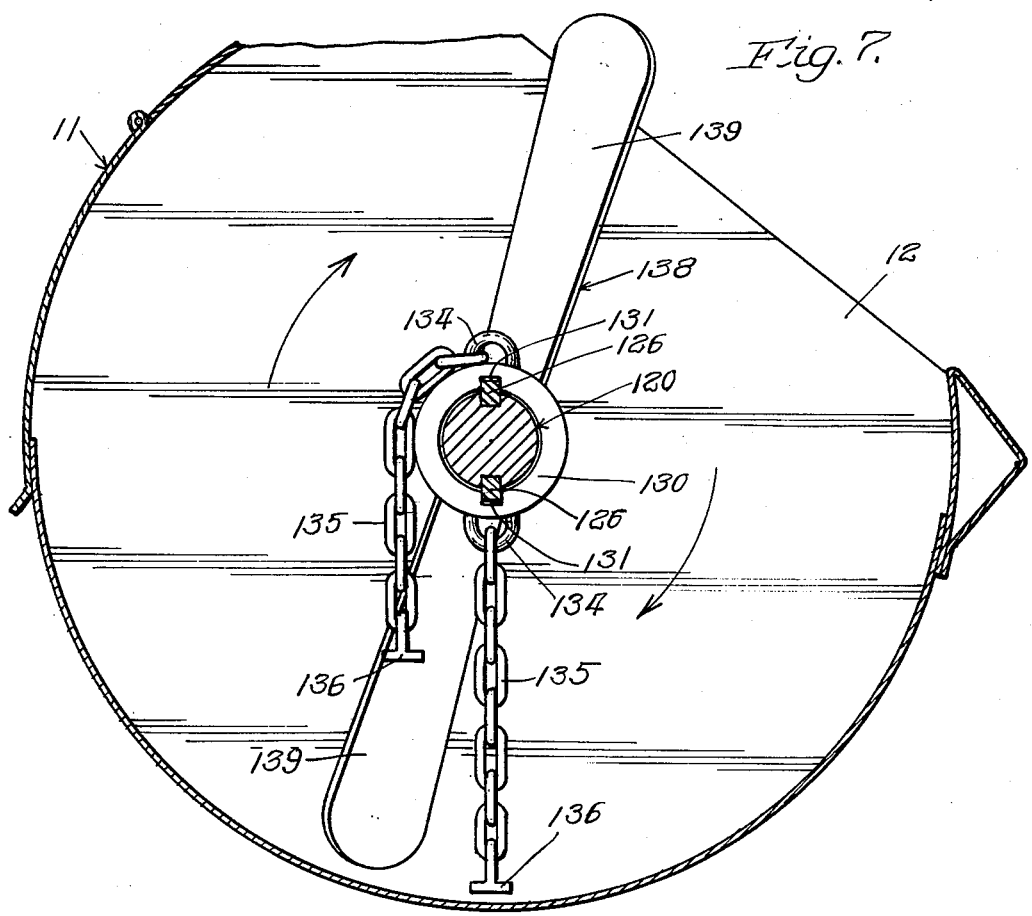

United States Patent Office 3,105,693
Patented Oct. 1, 1963

3,105,693
MATERIAL UNLOADING AND SPREADING
APPARATUS
Robert G. Ferris, Harvard, Ill., assignor to
Starline, Inc., a corporation of Illinois
Filed May 21, 1962, Ser. No. 196,389
12 Claims. (Cl. 275—3)

This invention relates to a material unloading device, and in particular it relates to a device which unloads and spreads manure or the like.

The principal object of the present invention is to provide a simple material unloading and spreading device which is of rugged construction and which may be driven from a tractor power take-off.

Another object of the invention is to provide a material unloading and spreading device in which the unloading operation is performed by flails mounted on a rotating shaft, with the flails arranged to travel from one end of the shaft to the other so as to progressively discharge material from the receptacle in which it is carried.

Yet another object of the invention is to provide a simple and positive means for causing a flail carrying collar to travel from one end of a rotating shaft to the other as material is discharged from a receptacle.

The invention is illustrated in a preferred and an alternative embodiment in the accompanying drawings in which:

FIG. 1 is a plan view of a material unloading device which incorporates a preferred embodiment of the invention;

FIG. 2 is a fragmentary side elevational view of the device of FIG. 1 with a portion of the unloader receptacle wall broken away to illustrate the operating mechanism;

FIG. 3 is a front elevational view of the unloader device of the invention, viewing FIG. 1 from the right-hand end;

FIG. 4 is a fragmentary section on an enlarged scale taken substantially as illustrated along the line 4—4 of FIG. 2;

FIG. 5 is a fragmentary side elevational view similar to FIG. 2, illustrating a typical position of the flails during an unloading operation;

FIG. 6 is a side elevational view of a material unloader which incorporates an alternative embodiment of the invention, a part of the receptacle side wall being broken away to illustrate the operating mechanism; and FIG. 7 is a fragmentary section on an enlarged scale taken substantially as illustrated along the line 7—7 of FIG. 6.

Referring to the drawings in greater detail, and referring first to FIGS. 1 to 5, the device of the present invention includes a wheeled carriage, indicated generally at 10, on which is mounted a material receptacle, indicated generally at 11, which is in the form of a longitudinal section of a cylinder. As best seen in FIG. 3, the receptacle 11 includes front and rear end walls 12 and 13, respectively, connected by an arcuate bottom panel 14. A triangular strengthening member 15 is secured to and extends a short distance upwardly from one longitudinal margin of the bottom panel 14, and is secured to the end walls; a supplemental arcuate panel 16 is also secured to the end walls 12 and 13 and to the longitudinal margin of bottom panel 14 opposite the strengthening member 15; and an arcuate hood member 17 is hingedly connected at 18 to the supplemental panel 16. A material discharge opening 19 is defined by the free edge 17a of the hood 17 when said hood is in a closed position as seen in FIG. 3, by an upper margin 15a of the strengthening member 15, and by marginal portions 12a and 13a of the end walls 12 and 13 which are in the form of chords of the circular end walls.

A rotatable unloader shaft, indicated generally at 20, is mounted in the end walls 12 and 13 on the axis of the cylindrical receptacle 11, and a power transmission assembly, indicated generally at 21, includes a mounting channel 22 secured to end wall 12 and an input shaft 23 of a power train, indicated generally at 24, which is adapted to be driven from the power take-off of a tractor (not shown), to rotate the unloader shaft 20.

A tongue 25 extends forwardly from the wheeled carriage 10 beneath the receptacle 11 and has a hitch plate 25a at its forward end which is adapted to be attached to the draw bar of a tractor.

The unloader shaft 20 has a pair of opposed splines 26 and 26a extending from end-to-end, and said splines are in the form of ratchets with teeth 27 and 27a, respectively, each of which has an inclined cam face 28 or 28a and a stop face 29 or 29a, so that the stop face of one tooth and the cam face of the next adjacent tooth cooperate to provide spaced recesses in the splines. As best seen in FIG. 5, the teeth 27a of spline 26a are offset by one-half tooth length, or pitch, from the teeth 27 on the spline 26.

As best seen in FIG. 4, a collar 30 is slidably mounted upon unloader shaft 20 and has opposed slots 31 to receive the splines 26 and 26a of the unloader shaft. A ring 32 is gimbal mounted on opposed pins 33 which extend radially from collar 30 on an axis which is perpendicular to a longitudinal plane through the splines 26 and 26a. Thus, the gimbal ring 32 may rock as illustrated in FIGS. 2 and 5.

A pair of flail carrying eyes 34 are mounted upon the gimbal ring 32 in the longitudinal plane through the splines, and said eyes 34 are also seen in FIGS. 2 and 5 to be in a plane which is perpendicular to said longitudinal plane and contains the axis afforded by the pins 33. A pair of flexible flails 35 in the form of heavy chains are secured to the eyes 34 and have flail plates 36 at their outer ends. The flails 35 may be generally wrapped around the gimbal ring 32 as seen in FIGS. 1 and 4, or may be extended radially as seen in FIGS. 2 and 5 so that the flail plates sweep the longitudinal receptacle wall which is provided by the arcuate faces of the bottom panel 14, the strengthening member 15, the supplemental panel 16, and the hood member 17.

In operation, the collar 30 is intended to move from a position adjacent the front wall 12 of the receptacle to a position adjacent the rear wall 13, and using the direction of movement of the collar as a reference, the ring carries ratchet-like means which engages the shaft 30 behind the trailing edge of the collar and moves stepwise along the shaft. In the particular embodiment shown, a pair of pivot bosses 37 and 37a are formed integrally with the trailing edge of the gimbal ring 32 to pivotally receive pawls 38 and 38a which are urged into engagement with the teeth 27 and 27a, respectively, behind the trailing edge of collar 30, by means of spring fingers 39 and 39a, respectively.

The term "ratchet-like means" is used herein to encompass all devices which are capable of stepwise movement along a shaft in response to rocking movement of a member on which the ratchet-like means is mounted.

Before the receptacle 11 is filled with manure or other material to be discharged from the receptacle and spread on the ground, unloader shaft 20 is rotated to wind both flails onto the gimbal ring, and the collar 30 is moved to a position immediately adjacent the front wall 12 of the receptacle. The receptacle may then be loaded with manure, as by the use of a ladder type conveyor of a barn gutter cleaner. A tractor to which the device is connected may then pull it to a field where manure is to be spread, and the tractor power take-off may be engaged to start rotation of the unloader shaft 20 in the direction indicated by the arrows in FIG. 4. Initially the flail chains 35 remain fairly closely wrapped about the gimbal ring, but as the flail plates 36 chew into the material in the receptacle 11 the flail chains are caused to extend by centrifugal force until the flail plates 36 are sweeping the longitudinal wall of the receptacle 11 immediately adjacent the end wall 12.

During operation of the unloader shaft, and as the flail plates 36 chew into the material, the flail chains are forced out of the direct radial orientation illustrated in FIG. 2 and impart a rocking action to the gimbal ring 32, as seen in FIG. 5. As this occurs, the pawls 38 and 38a alternately move along the incline to cam faces 28 and 28a of teeth 27 and 27a and drop in front of the stop faces 29 and 29a of the teeth. Thus, the rocking action of the gimbal ring 32, coupled with the stepwise movement of the pawls 38 and 38a along the teeth 27 and 27a of the splines gradually causes the collar 30 to slide along the unloader shaft 20 toward the rear end wall 13 of the receptacle. Accordingly, in response to rotation of the unloader shaft 20 and the progressive discharge of material from the receptacle by the flails, the collar 30 is caused to move gradually from the front wall 12 toward the rear wall 13.

Referring now to the alternative embodiment of the device illustrated in FIGS. 6 and 7, a wheeled carriage 10 and a material receptacle 11 are identical with those in the preferred form of the device, and thus are not described in detail except to state that the receptacle has a front wall 12 and a rear wall (not shown), and a discharge opening 19.

An unloader shaft, indicated generally at 120, is rotatably mounted in the receptacle 11, and is driven by power transmission means exactly as in the first form of the device.

A pair of opposed, smooth splines 126 extend from end-to-end of the unloader shaft 120, and a collar 130 has slots 131 to receive the splines. A forward portion 132 of the collar carries opposed eyes 134, and flail chains 135 mounted in the eyes have flail plates 136 at their outer ends exactly as in the first form of the device.

A trailing portion 137 of the collar is provided with a propeller, indicated generally at 138, the blades 139 of which have a pitch which tends to drive the collar 130 from the front wall 12 toward a rear wall (not shown) of the receptacle 11 as the unloader shaft 120 is rotated.

Accordingly, as the device is operated and the flails gradually remove material from a portion of the receptacle 11 immediately adjacent front wall 12, the propeller continues to urge the collar 130 rearwardly and causes the flails to chew into the material progressively more toward the rear of the receptacle, and discharge such material through the discharge opening 19 of the receptacle.

Although the flail carrying collars in both forms of the device are constructed to travel from front to rear during an unloading operation, it is clear that they may be so constructed as to travel from the rear toward the front if desired. The latter arrangement may be preferable because it keeps weight on the tractor draw bar, rather than tending to lift the rear of the tractor by reason of the unbalanced load concentrated at the rear of the receptacle as unloading progresses.

The foregoing detailed description is given for clearness of understanding only and no unnecessary limitations are to be understood therefrom, as some modifications will be obvious to those skilled in the art.

I claim:

1. In a material unloading device, in combination: a wheeled carriage; a material receptacle in the form of a longitudinal section of a cylinder surmounting said carriage; a rotatable unloader shaft on the longitudinal axis of the cylinder; means for driving said shaft; a collar mounted for rotation with said shaft and movable therealong; flexible material discharging flail means supported on said collar and having an extended position in which it sweeps the longitudinal cylinder wall; and means on the collar for driving it from one end of the shaft to the other in response to rotation of the shaft and progressive discharge of material from the receptacle by the flail means.

2. The device of claim 1 in which the collar has a fixed propeller with a pitch tending to drive the collar from said one end to said other end of the shaft, the flail being adjacent the leading edge of the collar and the propeller nearer the trailing edge as the collar is driven along the shaft.

3. The device of claim 1 in which the means for driving the collar includes a ring mounted on the collar for rocking movement in a plane generally perpendicular to the axis of the unloader shaft, two flails so mounted on the ring that they are free to oscillate fore-and-aft with respect to the ring, and unidirectional ratchet-like means having means carried by the ring and engaging the shaft so as to move stepwise along the shaft in response to rocking movement of the ring, said rocking movement being induced by a fore-and-aft movement inherently imparted to the flails as they cut into material in the receptacle.

4. The device of claim 3 in which the ratchet-like means includes a pair of opposed splines extending from end to end of the shaft and having longitudinally spaced recesses, and the means carried by the ring comprises a pair of spring loaded pawls mounted on the ring and engaging the recesses in the splines adjacent the collar as it is driven along the shaft.

5. The device of claim 4 in which the recesses in the splines are provided by teeth each of which has an inclined cam face which is ascended by a pawl as it moves along a spline, and a stop face retaining a pawl against reverse movement.

6. The device of claim 5 in which the stop faces on one of the splines are offset a half tooth length from the stop faces on the other of the splines.

7. The device of claim 3 in which the collar is provided with opposed pivots in a plane perpendicular to the longitudinal axis of the unloader shaft, and the ring is gimbal mounted on said pivots.

8. The device of claim 7 in which the ratchet-like means includes a pair of opposed splines extending from end to end of the shaft and having longitudinally spaced recesses, and the means carried by the ring comprises a pair of spring loaded pawls mounted on the ring and engaging the recesses in the splines behind the trailing edge of the collar as it is driven along the shaft.

9. The device of claim 8 in which the recesses in the splines are provided by teeth each of which has an inclined cam face which is ascended by a pawl as it moves along a spline, and a stop face retaining a pawl against reverse movement.

10. The device of claim 3 in which the means carried by the ring includes pivoted elements extending behind the trailing edge of the collar and there engaging the shaft.

11. In a material unloading device, in combination: a wheeled carriage; a material receptacle in the form of a longitudinal section of a cylinder surmounting said carriage; a rotatable unloader shaft on the longitudinal axis of the cylinder; means for driving said shaft; a collar mounted for rotation with said shaft and movable therealong; flexible material discharging flail means supported on said collar and having an extended position in which it sweeps the longitudinal cylinder wall; and means supported on the shaft and cooperating with the collar to drive the latter from one end of the shaft to the other in response to rotation of the shaft and progressive discharge of material from the receptacle by the flail means.

12. In a material unloading device, in combination: a wheeled carriage; a material receptacle in the form of a longitudinal section of a cylinder surmounting said carriage; a rotatable unloader shaft on the longitudinal axis of the cylinder; means for driving said shaft; a propeller carried on said shaft and rotatable therewith, said propeller having a pitch which tends to drive it from one end of the receptacle to the other; and flexible material discharging flail means supported on said shaft adjacent the propeller and between said propeller and said other end, said flail means occupying only a small part of the length of the shaft and being bodily movable along the receptacle by and with said propeller, whereby rotation of said shaft causes the flail means to discharge material and causes movement of the flail means and propeller along the receptacle as material is discharged therefrom.

References Cited in the file of this patent

UNITED STATES PATENTS

| | | |
|---|---|---|
| 2,886,332 | Elwick | May 12, 1959 |
| 2,954,235 | Parker | Sept. 27, 1960 |
| 3,004,765 | Wilkes | Oct. 17, 1961 |

FOREIGN PATENTS

| | | |
|---|---|---|
| 488,650 | Canada | Dec. 9, 1952 |